(12) United States Patent
Wiedemann et al.

(10) Patent No.: US 9,446,516 B2
(45) Date of Patent: Sep. 20, 2016

(54) METHOD AND MEANS FOR PROVIDING AND/OR CONTROLLING A MANIPULATOR PROCESS

(71) Applicant: KUKA Roboter GmbH, Augsburg (DE)

(72) Inventors: Guenther Wiedemann, Gersthofen (DE); Andreas Hagenauer, Friedberg (DE); Manfred Huettenhofer, Meitingen (DE); Martin Weiss, Sinzing-Viehhausen (DE)

(73) Assignee: KUKA Roboter GmbH, Augsburg (DE)

( * ) Notice: Subject to any disclaimer, the term of this patent is extended or adjusted under 35 U.S.C. 154(b) by 291 days.

(21) Appl. No.: 13/863,907

(22) Filed: Apr. 16, 2013

(65) Prior Publication Data

US 2013/0282177 A1    Oct. 24, 2013

(30) Foreign Application Priority Data

Apr. 24, 2012 (DE) .................. 10 2012 008 073

(51) Int. Cl.
| | | |
|---|---|---|
| G05B 19/04 | (2006.01) | |
| G05B 19/18 | (2006.01) | |
| B25J 9/16 | (2006.01) | |
| G05B 19/4155 | (2006.01) | |

(52) U.S. Cl.
CPC .......... B25J 9/1664 (2013.01); G05B 19/4155 (2013.01); *G05B 2219/40511* (2013.01); *G05B 2219/40518* (2013.01); *G05B 2219/40519* (2013.01)

(58) Field of Classification Search
CPC .... B25J 9/1664; B25J 9/1666; B25J 9/1674; B25J 9/1679; B25J 9/1684; G05B 19/4155; G05B 2219/40519; G05B 2219/40518; G05B 2219/40511

USPC .............. 700/245, 250, 253, 255, 258; 318/568.11, 568.12, 568.13, 568.16, 318/568.17, 568.18

See application file for complete search history.

(56) References Cited

U.S. PATENT DOCUMENTS

| | | | |
|---|---|---|---|
| 4,055,787 A | 10/1977 | Beadle et al. | |
| 5,014,183 A | 5/1991 | Carpenter et al. | |

(Continued)

FOREIGN PATENT DOCUMENTS

| | | | |
|---|---|---|---|
| CN | 1680079 A | 10/2005 | |
| CN | 1715010 A | 1/2006 | |

(Continued)

OTHER PUBLICATIONS

German Patent Office; Search Report in German Patent Application No. 10 2012 008 073.5 dated Jan. 17, 2013; 8 pages.

(Continued)

*Primary Examiner* — Jaime Figueroa
(74) *Attorney, Agent, or Firm* — Wood, Herron & Evans, LLP

(57) ABSTRACT

A method for designating and/or controlling a manipulator process for a manipulator configuration having at least one manipulator, in particular, an industrial robot, wherein the manipulator process includes a given oriented manipulator path for the manipulator configuration. The method includes designating or executing at least one action by the manipulator configuration, in particular, differently, in response to a reverse movement running counter to the oriented manipulator path, and/or a return movement running in the same direction as the oriented manipulator path.

12 Claims, 2 Drawing Sheets

(56) References Cited

U.S. PATENT DOCUMENTS

| | | | | |
|---|---|---|---|---|
| 5,793,635 | A * | 8/1998 | Niwa | 700/192 |
| 6,202,003 | B1 * | 3/2001 | Niwa | 700/192 |
| 6,285,921 | B1 * | 9/2001 | Ito et al. | 700/264 |
| 6,397,111 | B1 * | 5/2002 | Niwa | 700/11 |
| 8,909,373 | B2 * | 12/2014 | Bjorn | 700/253 |
| 2005/0159840 | A1 * | 7/2005 | Lin et al. | 700/245 |
| 2006/0009878 | A1 | 1/2006 | Kobayashi et al. | |
| 2012/0245733 | A1 * | 9/2012 | Bjorn | 700/253 |

FOREIGN PATENT DOCUMENTS

| | | |
|---|---|---|
| CN | 102317044 A | 1/2012 |
| CN | 102387900 A | 3/2012 |
| DE | 697 36 733 T2 | 2/2007 |
| DE | 10 2008 007 438 A1 | 8/2009 |
| EP | 0 046 032 A1 | 2/1982 |
| EP | 0 368 088 A1 | 5/1990 |
| EP | 0 673 726 A2 | 9/1995 |
| EP | 0 782 056 A1 | 7/1997 |
| EP | 1380393 A2 | 1/2004 |

OTHER PUBLICATIONS

Chinese Patent Office; Search Report in Chinese Patent Application No. 201310045743.6 dated Jan. 27, 2015; 2 pages.

Chinese Patent Office; Office Action in Chinese Patent Application No. 201310045743.6 dated Feb. 2, 23015; 13 pages.

\* cited by examiner

METHOD AND MEANS FOR PROVIDING AND/OR CONTROLLING A MANIPULATOR PROCESS

TECHNICAL FIELD

The present invention relates to a method and a means for providing and/or controlling a manipulator process.

BACKGROUND

When traveling a manipulator path, various actions are to be executed, frequently depending on the position on the path. By way of example, a welding current is to be switched on or off, an adhesive or paint nozzle is to be opened or closed, or a clamping fixture is to be opened or closed, at sections, in order to enable the passage of a manipulator-guided tool.

For this, it is known in the field to define switching points, referred to as switching path-points in the following, by means of a switching point routine, which includes a sub-routine for executing the action, basically in the form:

```
...
SLIN P
TRIGGER WHEN PATH=abstand [:distance] DELAY=Zeit
[:Time]DOUnterroutine[:Subroutine]
SLIN Q
...
```

A switching path-point is defined by this switching point routine TRIGGER, between the path points P and Q at a distance Abstand from the end pointQ of the section of the manipulator path defined as a Cartesian line by SLIN Q. When arriving at the switching path-point defined in this manner, after (or before, respectively, when Zeit<0) the time Zeit, the action defined by the subroutine Unterroutine is executed, e.g. a welding current is switched on, an adhesive or paint nozzle, or a clamping fixture, is opened.

When traveling along a defined manipulator path it may be necessary to retrace a section, e.g. after detecting a disruption in the process.

The disadvantage with retracing the path in this manner is that the switching point routines explained above are not executed. If, for example, a clamping fixture must be opened in order to enable the passage of a manipulator-guided tool, it is not automatically re-opened during the retracing of the path by the switching point routine—which only functions with respect to forward movement between points P and Q.

The object of the present invention is to improve a manipulator process.

This object is achieved by a method having the features of claim 1. Claim 7 places a means for executing such a method under protection. The dependent claims relate to advantageous further developments.

SUMMARY

One aspect of the present invention relates to a manipulator process for a manipulator assembly having one or more manipulators, in particular industrial robots. The manipulator process has a defined, oriented manipulator path for the manipulator assembly. A manipulator path is understood in the present case to be, in particular, a discreet or continuous sequence of positions, in particular positions and/or orientations of one or more permanent reference points for the manipulator, in particular a TCP for a manipulator, and/or poses, in particular joint coordinates, for one or more manipulators. The manipulator path can be defined, in particular, by specifying discreet, in particular learned, path points, and by specifying a path between these path points, such as a straight line or circle segment, in the workspace or configuration space, or also by specifying a mapping or relation, e.g. a spline function in the workspace or configuration space. An oriented manipulator path is understood in the present case, in particular, to be a manipulator path having a defined directional orientation or travel orientation, which can be defined, for example, by a series of points that are to be approached and/or passed over.

For this manipulator process, or the manipulator path thereof, according to one aspect of the present invention, one or more actions can be defined and/or executed in this manipulator process or the during the traveling of its manipulator path, respectively. An action as set forth in the present invention can comprise, in particular, be, a logical and/or mathematical computing and/or storage operation, in particular the assignment of a variable, and/or a control of the manipulator assembly, in particular one or more manipulator-guided tools and/or tools that are permanently installed in the environment, and/or processing means. An action as set forth in the present invention can, for example, be the assignment of a value to an identifier, the providing of current to a manipulator-guided welding tongs, or the closing of a clamping device permanently installed in the environment.

One or more of these actions can be defined and/or executed, depending on a reverse movement initiated by an event, running in the opposite direction of the oriented manipulator path, and/or a return movement of the manipulator assembly running in the same direction as the oriented manipulator path. An event initiated movement is understood in the present case, in particular, to mean a movement of the manipulator assembly that is initiated, or executed, due to an external, in particular, not specified, and/or not normal, event. In one embodiment, an event initiated reverse movement can be triggered by a manual input from a user, by actuating a reverse button, for example, and/or by a signal, in particular a malfunction signal, or by the actuation of an emergency stop, a deviation from the manipulator path, an erroneous value for the welding current when the supply of inert gas is interrupted, or suchlike. In one embodiment, an event initiated movement is characterized in that it does not always occur at the same path point during every travel of the defined manipulator path, and/or depends on other ancillary conditions, not belonging to the manipulator path.

A reverse movement in the opposite direction is understood, in the present case, to mean, in particular, a movement of the manipulator assembly, in particular one or more manipulators, which—at least in sections—occurs in the opposite direction to the oriented manipulator path. The reverse movement can have, in particular, a starting point, which lies on the manipulator path, i.e. starting from the manipulator path, and runs in the opposite direction of the manipulator path, on a local basis, with respect to this starting point. The reverse movement can have a section that is parallel to the manipulator path. A parallel section is understood in the present case, in particular, to mean a congruent section in the workspace or configuration space, e.g. a parallel straight line, a concentric circle segment, or suchlike. In particular, the parallel section can also be identical to a section of the manipulator path that is to be traveled in the opposite direction, i.e. the reverse movement can occur—at least in sections—on the manipulator path. Likewise, the reverse movement can include a section leading away from the manipulator path, to which, in particular, a parallel section can adjoin, such that the manipulator path can be traveled in the opposite direction, with an offset, or a displacement thereto, during the reverse movement.

A return movement in the same direction is understood, in the present case, to mean, in particular, a movement of the manipulator assembly, in particular one or more manipulators, which follows—at least in sections—the oriented manipulator path in its normal direction. The return movement in the same direction can occur in one embodiment, following a reverse movement in the opposite direction, in particular immediately, or after a pause, and/or include an end point that lies on the manipulator path, and with respect thereto, the return movement can be in the same direction as the manipulator path on a local basis. The end point, or its projection, respectively, can be identical to the starting point of a preceding reverse movement, or its projection, respectively, or—in the travel direction of the manipulator path—lie in front of or behind said point. In one embodiment, travel is continued along the defined manipulator path after an event initiated travel along the reverse movement or the return movement, starting at the end point thereof.

The return movement can likewise include a section that is parallel to the manipulator path, in particular, it can be identical to a section—that is to be traveled again in the normal direction—i.e. the return movement can—at least in sections—occur on the manipulator path. Likewise, the return movement can include a section that returns to the manipulator path, in particular in order to compensate for an offset, or displacement resulting from a preceding reverse movement.

One or more of the actions can be specified or executed, respectively, as a function of the reverse movement. In particular, it may be provided that one or more actions are executed selectively, in particular also, or only, during the reverse movement. Thus, for example, a clamping fixture, which has been closed during the travel along the defined manipulator path after the passage of a manipulator-guided tool, is again opened during a reverse movement.

In addition, or alternatively, one or more actions can be specified or executed as a function of the return movement. In particular, it may be provided that one or more actions are executed selectively, in particular also, or only, during the return movement. Thus, for example, a clamping fixture that is re-opened during a reverse movement is again closed during a return movement after the passage of a manipulator-guided tool.

One or more actions can be specified or executed, in particular, during or after the completion of a reverse movement and/or a return movement. By way of example, it may be practical to re-execute actions that are executed at the start of the manipulator process, such as a visual or acoustic warning, a rinsing, tempering, or suchlike, upon completion of the reverse movement and/or the return movement. Likewise, one or more actions can also be executed during the reverse or return movement, in particular as a function of the position of the manipulator assembly in relation to the defined manipulator path.

One or more actions can be specified or executed in a different manner, in one embodiment, as a function of the reverse movement and/or the return movement. This is understood to mean, in the present case, in particular, that one action—by way of example, the assignment of a value to a variable or the opening of a clamp designating fixture—is specified for a reverse movement, or can be executed during a reverse movement, respectively, and a different action—by way of example, the assignment of another value to the variable, or the closing of a clamp designating fixture—is specified for a return movement, or can be executed during a return movement, respectively. Additionally, or alternatively, the same, or a different, action—by way of example, the assignment of another value to the variables—can be specified for the travel along the defined manipulator path, or can be executed during the travel along the defined manipulator path, respectively. In general, it is provided thereby that the action for the normal travel along the defined manipulator path, the event initiated execution of a reverse movement and/or a, in particular subsequent thereto, return movement, can be specified in different ways, or can be executed selectively. An action can be also executed in different ways, in particular, in that it can be executed or not executed selectively.

As explained in the above introduction, it is known in the field to provide one or more switching path-points for a manipulator path, in order to trigger a specified action during the normal travel along a manipulator path, as a function of these switching path-points, in particular upon arriving or passing over these points, e.g. the opening of a clamping fixture, supplying current to a manipulator-guided welding tongs, etc.

According to one embodiment of the present invention, such switching path-points are then also used to specify or execute, respectively, an action as a function of the reverse movement and/or return movement, in particular selectively, or differently, respectively. The action can thus be specified, or executed, in particular differently, as a function of the reverse movement and/or the return movement, and as a function of a switching path-point.

In a further development, the action can be specified or executed, in particular differently, as a function of a projected distance of the manipulator assembly to a switching path-point during the reverse movement and/or the return movement. While traveling along the defined manipulator path, a point that identifies the position of the manipulator assembly moves, by way of example, the TCP in the workspace, or a vector of the joint coordinates in the configuration space, on the manipulator path defined in this space. During a reverse or return movement, this point moves accordingly in the workspace or configuration space, when displaced from the manipulator path. This point can be projected onto the manipulator path, in particular parallel to a norm on the manipulator path or the reverse or return movement. Likewise, the switching path-point can, conversely, also be projected onto the reverse or return movement, in particular when this occurs—at least in sections—automatically, in one embodiment of the present invention, and is thus defined, for example, parallel to a section of the manipulator path. The projected point can also be displaced in relation to the perpendicular projection onto the manipulator path or the reverse or return movement path, in, or opposite to, the normal direction of travel thereof, in particular, it can anticipate or lag behind an actual movement. A projected distance of the manipulator assembly is understood in the present case, in particular, to mean the distance of a point identifying the position of the manipulator assembly, projected onto the manipulator path, to the switching path-point, or the distance of a point identifying the position of the manipulator assembly to the switching path-point projected onto the reverse or return movement (path). The action can then be executed, in particular, when the projected distance is less than a threshold value, in particular approaches zero, in particular when a point identifying the position of the manipulator assembly, projected onto the manipulator path, arrives at, or passes, a switching path-point. Visually, the projected point can be conceived of as a point on the manipulator path, which moves in a manner corresponding to a reverse or return movement on the manipulator path. If the reverse or return movement occurs—at least in sections—on the manipulator path, then the projection can be an identifier.

In addition, or alternatively, to an, in particular different, execution of the action upon arriving at or passing a switching path-point allocated to this action by a point identifying the position of the manipulator assembly projected onto the manipulator path, an action can also occur upon completion of a reverse and/or return movement, as a function thereof, whether the projected distance of the manipulator assembly to this switching path-point is positive or negative. In this manner, actions, in particular those, the switching path-point of which has already be traveled over during travel along a section of the manipulator path, can be selectively executed again, in particular also when they are not traveled over in a projected manner during the reverse or return movement.

As explained above, it is known in the field to define switching path-points by mean of a switching point routine, which includes a subroutine for executing an action, basically in the form:

```
...
SLIN P
TRIGGER WHEN PATH=Abstand [:distance] DO Unterroutine
[:subroutine]
SLIN Q
...
```

In a preferred embodiment the functionality of the switching point routine is expanded such that this can be specified, or is executed, respectively, in particular differently, as a function of the reverse movement and/or return movement, for example in the form:

```
...
SLIN P
TRIGGER WHEN PATH=Abstand [:distance] DO Unterroutine
[:subroutine][FIRE_COND=Bewegung [:movement]]
SLIN Q
...
```

The preferably Boolean and/or multi-value variable Bewegung can, in particular, be a system variable, which indicates which type of movement is currently occurring. Via this variable it can be determined whether the switching point routine is to be executed, if the defined manipulator path is to be traveled (Bewegung=REGULAR), a reverse movement is to be executed (Bewegung=BACKWARD), a reverse movement has been completed (Bewegung=RESTART), a return movement is to be executed (Bewegung=REPLAY) and/or a return movement is completed. Preferably the switching point routine is executed as a default only when traveling along the manipulator path, or is always executed as a default.

Additionally or alternatively, the functionality of the subroutine can be expanded such that this subroutine can be specified, or is executed, respectively, in particular differently, as a function of the reverse movement and/or the return movement, for example in the form:

```
...
SLIN P
TRIGGER WHEN PATH=Abstand [:distance] DO Unterroutine
[:subroutine]( )[FIRE_COND=Bewegung [:movement]]
SLIN Q
...
``` wherein the movement context is evaluated in the subroutine:

```
DEF Unterroutine [:subroutine]( )
...
SWITCH $TRIGGER_UP_CONTEXT
    CASE #REGULAR:
        RegularAction
    CASE #BACKWARD:
        BackwardAction
    CASE #RESTART:
        RestartAction
    CASE #REPLAY:
        ReplayAction
ENDSWITCH
...
END
```

The subroutine unterroutine defined in the switching point routine executes an action differently, depending on the system variables $TRIGGER_UP_CONTEXT=Bewegung [:movement]. For this, the subroutine can re-access to the system variable, or the system variable can be provided to the subroutine, basically in the form: subroutine (Bewegung).

If, therefore, during the current operation, for example, a defined manipulator path is traveled, the system variable Bewegung [:movement] is designated as "REGULAR." Accordingly, the trigger can be activated in the example above, if this variable is defined by "FIRE_COND=REGULAR." In the lower example, the subroutine accesses this system variable Bewegung [:movement] and executes accordingly ("CASE #REGULAR"), the action RegularAction provided for this.

One aspect of the present invention relates to a method for providing a manipulator process. Providing is understood to mean, in particular, the creation and/or modification, in particular parameterizing, a program for the manipulator assembly, for example by using and parameterizing the expanded functionalities, explained above, of a switching point routine and/or a subroutine. Another aspect of the present invention relates to a method for controlling such a manipulator process. Controlling is understood in the present case, in particular, to be the transmission or implementation of movement and other control commands for the manipulator assembly and/or the actuation thereof, e.g. supplying current to drives and/or tools, in particular, the execution of a program. Another aspect of the present invention relates to a means for providing and/or controlling such a manipulator process. A means as set forth in the present invention, can be, in particular, designed in terms of software or hardware technology. In one embodiment, it comprises a program, a computer program product, in particular a data carrier having a program stored thereon, and/or a computer with an input/output means, in particular a keyboard, a monitor or suchlike, a storage medium, and a processing, or computing means. The means is equipped, in particular, for specifying and/or controlling the manipulator process, and can, for this purpose, include one or more commands, for example, in particular commands that can be parameterized.

BRIEF DESCRIPTION OF THE FIGURES

Further advantages and features can be derived from the following examples. For this, the drawings show, in part schematically.

DETAILED DESCRIPTION

Figure 1:
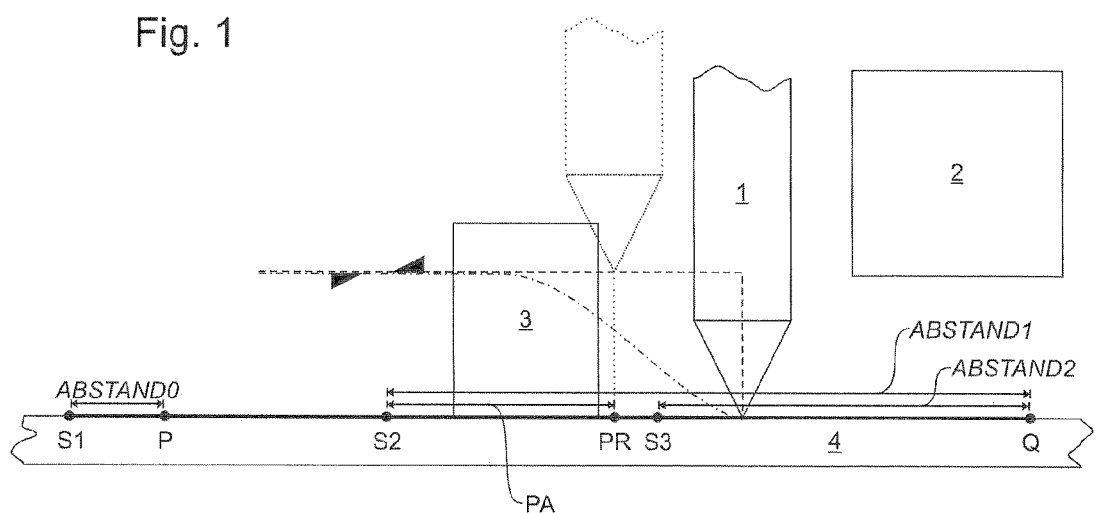
FIG. 1 is a portion of a manipulator assembly during execution of a manipulator process, according to an embodiment of the present invention.

FIG. 1 shows a robot guided welding tongs electrode 1 and a robot control device 2 of a manipulator configuration according to one design of the present invention in a manipulator process in the form of a welding of a workpiece 4 held in place by a clamp 3, which, by means of a means, or according to a method, is designated, or will be executed, respectively, according to one design of the present invention. The robot control device 2 represents a means, as set forth in the present invention, for designating and controlling the manipulator processes of the manipulator configuration.

The manipulator path of the TCP, in this case, the tip of the welding tongs electrode 1, is shown in an expanded form. It is designated, for example, by means of the program command:

TRIGGER WHEN PATH=Abstand0 DO TEMP FIRE_COND=(TRUE, FALSE, FALSE, TRUE)
SLIN P
TRIGGER WHEN PATH=Abstand1 DO OPEN(FIRE_COND)
TRIGGER WHEN PATH=Abstand2 DO CLOSE(FIRE_COND)
SLIN Q with the taught path points P, Q.

The value FIRE_COND exhibits four Boolean expressions:

FIRE_COND=(TRUE, FALSE, FALSE, FALSE) indicates a regular travelling of the designated manipulator track, FIRE_COND=(FALSE, TRUE, FALSE, FALSE) indicates a reverse movement (line comprised of dashes in FIG. 1), FIRE_COND=(FALSE, FALSE, TRUE, FALSE) indicates a return movement (line comprised of dashes and dots in FIG. 1), and FIRE_COND=(FALSE, FALSE, FALSE, TRUE) indicates the completion of a reverse movement.

In a regular travelling of the designated manipulator path, in particular in the automatic mode, FIRE_COND=(TRUE, FALSE, FALSE, FALSE) is provided. If an event, such as an error signal, or the actuation of a reverse travel button, for example, initiates a reverse movement, the value is changed to FIRE_COND=(FALSE, TRUE, FALSE, FALSE). If the reverse movement is completed, because the reverse travel button is no longer actuated, or an automatic retraction is obtained as a result of the error signal, for example, the value is changed to FIRE_COND=(FALSE, FALSE, FALSE, TRUE). For the return movement, the value is changed to FIRE_COND=(FALSE, FALSE, TRUE, FALSE), and for the continuation of travel, is finally changed back to FIRE_COND=(TRUE, FALSE, FALSE, FALSE).

First, a regular travelling of the manipulator path shall be explained:

When the welding tongs electrode 1 reaches the first switching path-point S1, lying at Abstand0 [: Spacing0] from the point P, the subroutine TEMP is activated, because the switching point routine TRIGGER WHEN PATH=Abstand0 DO TEMP FIRE_COND=(TRUE, FALSE, FALSE, TRUE)

is executed, if the first or the fourth expression in FIRE_COND is "TRUE". This routine pre-tempers the workpiece 4.

When the welding tongs electrode 1 reaches the second switching path-point S2, lying at the Abstand1 [:Spacing1] from the point Q, the subroutine OPEN having the values FIRE_COND=(TRUE, FALSE, FALSE, FALSE) is activated. This subroutine opens the clamp 3, if the first or third Boolean expression is TRUE.

The welding tongs electrode 1 travels past the open clamp 3. When the welding tongs electrode 1 reaches the third switching path-point S3, lying at Abstand2 from the point Q, the subroutine CLOSE having the values FIRE_COND=(TRUE, FALSE, FALSE, FALSE) is activated. This subroutine closes the clamp 3, if the first or third Boolean expression is TRUE.

If an event initiates a reverse movement, then the welding tongs electrode 1 moves automatically, as indicated in FIG. 1 by the line comprised of dashes. Its vertical projection PR on the manipulator path (vertical in FIG. 1), indicated in FIG. 1 by a dotted line for a position of the manipulator configuration, or its welding tongs electrode 1 during the reverse movement, first travels over the third switching point S3 in the course of this reverse movement. The switching point routine assigned to it, TRIGGER WHEN PATH=Abstand2 DO CLOSE(FIRE_COND)

activates thereby the subroutine CLOSE having the values FIRE_COND=(FALSE, TRUE, FALSE, FALSE). This then opens (due to the reverse movement) the clamp 3, i.e. executes a different action, in order to enable the passage of the welding tongs electrode 1.

Accordingly, the subroutine OPEN, activated with FIRE_COND=(FALSE, TRUE, FALSE, FALSE), then closes the clamp 3 after the passage of the welding tongs electrode 1, when its projection passes the second switching path-point S2, in order to again fix the workpiece 4 in place. For clarification, the projected spacing PA of the projection PR to the switching track-point S2 is indicated in FIG. 1. If this spacing is zero, the switching point routine is activated.

If the reverse movement is completed, the values are changed to FIRE_COND=(FALSE, FALSE, FALSE, TRUE). Because the first switching point S1 lies in front of the projection of the welding tongs electrode 1, the switching point routine assigned to it is executed, i.e. a—intermediate, if applicable, according to the program, switched off—pre-tempering is again carried out.

At this point, the welding tongs electrode 1 travels automatically back to the manipulator path (indicated by a line comprised of dashes and dots in FIG. 1), and the values are changed to FIRE_COND=(FALSE, FALSE, TRUE, FALSE).

If the projection of the welding tongs electrode 1 passes over the second or third, respectively, switching points S2, or S3, respectively, on the manipulator path, then the switching point routines assigned thereto activates the subroutine OPEN or CLOSE, respectively, having the values FIRE_COND=(FALSE, FALSE, TRUE, FALSE), which in turn— as with a regular travelling of the manipulator path—opens, or closes, respectively, the clamp 3.

Subsequently, the manipulator path is again followed.

One can see that by means of the expansion of the functionality of the switching point routines, or, respectively, their subroutines, such that they are executed in relation to a reverse or a return movement, the manipulator processes can be designated or controlled, respectively, in a well-ordered and, in particular, automatic manner, even in the case of a deviation from a regular travelling of the manipulator path initiated by an event.

For this, it can be advantageous, particularly with simple subroutines, to activate, or execute, respectively, the switching point routines oneself in relation to the reverse and return movements, as is explained in an exemplary manner in the example of the switching point routine for the first switching point. Likewise, it may be advantageous to designate, or execute, respectively, the subroutines differently, in relation to the reverse and return movement, as is explained in an exemplary manner for the example of the switching point routine for the second and third switching points.

Figure 2:
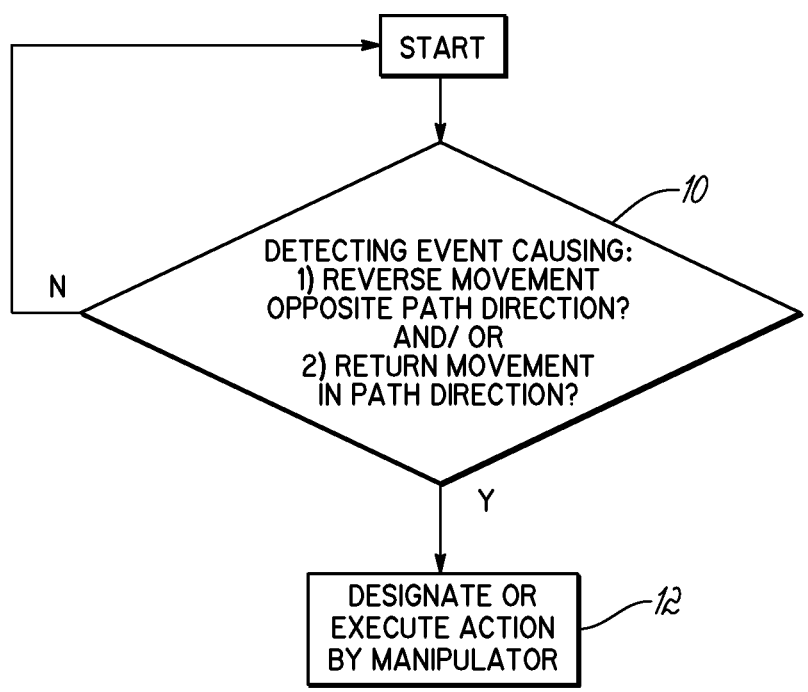
FIG. 2 is a flowchart illustrating an exemplary method in accordance with one aspect of the present disclosure.

FIG. 2 illustrates an exemplary method in accordance with the principles of the present disclosure. In a first step 10, the control device 2 determines whether an event has been detected that causes at least one of a reverse movement of the manipulator in a direction opposite the manipulator path, or a return movement of the manipulator in the same direction as the manipulator path. If no event is detected, the control device 2 continues to check for the occurrence of such an event. If the occurrence of an event is detected, then the controller 2 designates or executes an action by the manipulator, as described above, in at least a second step 12.

LIST OF REFERENCE SYMBOL

1 welding tongs electrode (manipulator configuration)
2 robot control device (manipulator configuration)
3 clamp (manipulator configuration)
4 workpiece
S1, S2, S3 switching path-points
P, Q taught path points
PA projected spacing
PR projection onto the manipulator path

What is claimed is:

1. A method for designating or controlling a manipulator process for a manipulator configuration having at least one robotic manipulator and a controller that controls movement of the robotic manipulator, wherein the manipulator process includes a given oriented manipulator path for the manipulator configuration, the method comprising:
   controlling movement of the robotic manipulator with the controller in at least one of a reverse movement of the robotic manipulator, running counter to the direction of the oriented manipulator path, or a return movement of the manipulator, running in the same direction as the oriented manipulator path, in response to an event; and
   designating or executing at least one action by the manipulator configuration based on the reverse movement or the return movement.

2. The method according to claim 1, wherein:
   the manipulator path includes at least one switching path-point, and
   designating or executing the at least one action includes designating or executing the action in relation to the switching path-point.

3. A method for designating or controlling a manipulator process for a manipulator configuration having at least one robotic manipulator and a controller that controls movement of the robotic manipulator, wherein the manipulator process includes a given oriented manipulator path for the manipulator configuration, the method comprising:
   detecting with the controller the occurrence of an event that causes at least one of a reverse movement of the robotic manipulator, running counter to the direction of the oriented manipulator path, or a return movement of the manipulator, running in the same direction as the oriented manipulator path; and
   designating or executing at least one action by the manipulator configuration in response to the detected occurrence;
   wherein the manipulator path includes at least one switching path-point, and
   designating or executing the at least one action includes designating or executing the action in relation to the switching path-point; and
   wherein designating or executing the at least one action includes designating or executing the action in relation to a projected spacing of the manipulator configuration to said switching path-point for at least one of the reverse movement or the return movement.

4. The method according to claim 1, wherein the controller includes a switching point routine, the switching point routine including a subroutine for executing the action,
   the method further comprising designating or executing the switching point routine or the subroutine in relation to at least one of the reverse movement or the return movement.

5. The method according to claim 1, wherein the reverse movement includes at least one of a starting point on the manipulator path, a section leading away from the manipulator path, or a section running parallel to the manipulator path.

6. The method according to claim 1, wherein the return movement includes at least one of a section running parallel to the manipulator path, a section running back to the manipulator path, or an end point on the manipulator path.

7. A computer for designating or controlling a manipulator process for a manipulator configuration having at least one manipulator, in particular, an industrial robot, wherein the manipulator process exhibits a given oriented manipulator path for the manipulator configuration, the computer comprising a non-transitory storage medium including program code that when executed by the computer, causes the computer to:
   designate, or to execute, an action by the manipulator configuration in response to a reverse movement, running counter to the oriented manipulator path, or a return movement, running in the same direction as the oriented manipulator path.

8. The computer according to claim 7, wherein the manipulator path includes at least one switching path-point, and the action is designated or executed in relation to the switching path-point.

9. A computer for designating or controlling a manipulator process for a manipulator configuration having at least one manipulator, in particular, an industrial robot, wherein the manipulator process exhibits a given oriented manipulator path for the manipulator configuration, the computer comprising a non-transitory storage medium including program code that when executed by the computer, causes the computer to:
   designate, or to execute, an action by the manipulator configuration in response to the detection of an event that causes at least one of a reverse movement, running counter to the oriented manipulator path, or a return movement, running in the same direction as the oriented manipulator path;

wherein the manipulator path includes at least one switching path-point, and the action is designated or executed in relation to the switching path-point; and wherein the action is designated, or executed, in relation to a projected spacing of the manipulator configuration to the switching path-point for at least one of the reverse movement or the return movement.

10. The computer according to claim 7, wherein the program code further comprises a switching point routine including a subroutine for executing the action, wherein the switching point routine or the subroutine is designated, or executed, in relation to at least one of the reverse movement or the return movement.

11. The computer according to claim 7, wherein the reverse movement includes at least one of a starting point on the manipulator path, a section leading away from the manipulator path, or a section running parallel to the manipulator path.

12. The computer according to claim 7, wherein the return movement includes at least one of a section running parallel to the manipulator path, a section leading back to the manipulator path, or an end point on the manipulator path.

* * * * *